United States Patent Office 3,717,581
Patented Feb. 20, 1973

3,717,581
METHOD FOR THE PREPARATION OF GRAINS
Arend J. Noothout, Oosterbeek, Netherlands, assignor to Reactor Centrum Nederland, The Hague, Netherlands
No Drawing. Filed Jan. 5, 1970, Ser. No. 839
Claims priority, application Netherlands, Jan. 6, 1969, 6900701
Int. Cl. C09r 3/00
U.S. Cl. 252—301.1 R    18 Claims

ABSTRACT OF THE DISCLOSURE

A method for preparing particles of metal hydroxide gels by treating a concentrated aqueous solution of at least one hydrolyzable metal salt, the hydroxide of which is only slightly soluble in water, simultaneously with ammonia and heat. The solid substance thus obtained is separated, washed and heated thereby converting the solid substance to metal oxide particles. The hydrolyzable metal salt starting materials are concentrated solutions anion-deficient metal salt solutions, having a ratio of conjugated base to metal lower than that of the normal salt. When a nitrate-deficient uranyl nitrate solution is mixed with an ammonia-releasing agent, then dispersed in a hot phase immiscible with the aqueous phase, the resulting solidification produces microspheres of uranyl nitrate, which are useful as fuel cells in nuclear reactors.

---

The invention relates to the preparation of grains consisting of a metal oxide hydrate, a metal oxide hydrate together with carbon, metal oxide and metal carbide. Although the invention is applicable to many metal oxide hydrates and the oxides and carbides obtainable from them, it applies more particularly to the preparation of uranium (VI) oxide hydrate particles.

It is known to solidify concentrated aqueous solutions of hydrolysable metal salts by the simultaneous action of ammonia and heat, after which the solid substance thus obtained is separated, washed and subjected to thermal treatment. Finely divided carbon may, if desired, be dispersed in the aqueous metal salt solution if one wishes to prepare grains of metal oxide hydrate together with carbon or metal carbide.

The metals from which the above-mentioned salts are derived should have hydroxides which are poorly soluble in water.

The metal oxide-hydrate as referred to in the foregoing should be understood to mean both a hydrated oxide and one or more hydrated oxides containing ammonia.

Three of such compounds are described, for instance, on page 128 of the thesis by Dr.Ir. M.E.A. Hermans, Delft, 1964: $UO_3 \cdot 5/3 H_2O \cdot 1/3 NH_3$; $UO_3 \cdot 3/2 H_2O \cdot 1/2 NH_3$ and $UO_3 \cdot 4/3 H_2O \cdot 2/3 NH_3$, which compounds are derived from $UO_3 \cdot 2H_2O$, part of the water of crystallization having been replaced by ammonia.

The ammonia required for solidification may be added in the form of a concentrated solution of one or more substances from which ammonia is released on heating. Solidification is subsequently effected by heating the mixed solutions. Substances capable of releasing ammonia on heating in aqueous solution will henceforth be indicated as ammonia-releasing agents.

The heating may be effected by all known methods. By the heating of mixed solutions of salts and ammonia-releasing agents it is possible to obtain pieces of solid substance.

Spherical particles can be obtained by dispersing the mixed solutions of salts and ammonia-releasing agents in a phase which is immiscible with water, having a temperature sufficiently high to decompose the ammonia-releasing agent.

It is likewise possible to disperse the concentrated salt solution in a hot phase, immiscible with water, through which ammonia gas is passed.

It is known, in connection with the foregoing, to mix solutions of metal salts with an ammonia-releasing agent and afterwards to disperse these solutions in an alcohol having 4–10 carbon atoms. It is assumed in this respect that any anion-cation combination of the cations $U^{+4}$, $(UO_2)^{+2}$, $Th^{+4}$, $Pu^{+4}$, $(PuO)^{+2}$, $(ZrO)^{+2}$, $Be^{+2}$ and $Y^{+3}$ or mixtures thereof is possible. Chlorides, bromides, nitrates, sulphates, formate and acetates may be mentioned as examples of suitable anions. Hexamethylenetetramine, acetamide, ammonium carbonate, ammonium cyanate, urea and mixtures of these substances are mentioned as examples of ammonia-releasing agents.

However, it has been found in practice that no homogeneous solidification of a concentrated uranyl nitrate solution occurs in this way, so that it is not possible, for instance, to prepare microspheres of uranium trioxide from this solution.

It has been found quite feasible to prepare uranium trioxide spheres in the above-mentioned manner from concentrated uranyl chloride solutions. As uranyl chloride is much less easy to obtain commercially than uranyl nitrate, uranyl nitrate is a better starting material in principle for the preparation of fissile materials for nuclear reactors. Traces of chloride in the final product are moreover, often unwanted.

The invention aims at increasing the possibilities of application of uranyl nitrate as starting material for granular fissible materials. Although the invention relates more particularly to uranyl nitrate solutions, there are most certainly other fields of application for many other salts with a hydrolysable cation that can yield a hydroxide which is poorly soluble in water.

According to the invention, anion-deficient salt solutions are taken as initial material. By anion-deficient salt solution is meant salt solutions whose ratio of conjugated base to metal is lower than that of the normal salt, subject to the proviso that the OH-ion is not considered as a conjugated base.

Possible methods of preparation of anion-deficient salt solutions are: removal of anions from salt solutions or direct preparation of anion-deficient salt solutions by dissolving metal oxides in a deficiency of acid or by dissolving metal oxides in a solution of the normal salt.

Examples of direct methods of preparation of anion-deficient salt solutions are: the procedures of preparing nitrate-deficient uranyl nitrate by dissolving uranium trioxide in a deficiency of nitric acid or in uranyl nitrate solution.

The removal of anions from a normal salt solution is preferably effected by contacting the solution with a liquid anion-exchanger. Very suitable liquid anion-exchangers are: primary amines such as Primene JMT, dissolved in an organic solvent.

The use of anion-deficient solutions offers, inter alia, the advantage that these solutions may possess much higher cation concentrations than normal or non-anion-deficient salt solutions. A nitrate-deficient uranyl nitrate solution can for instance be prepared in concentrations of 3.5 molar or more. A uranium nitrate solution of this kind has a molar nitrate-to-uranium ratio of approximately 1.5 instead of 2.

It has been found as a surprising phenomenon that a nitrate-deficient uranyl nitrate solution of this kind could be mixed with an excess of an ammonia-releasing agent without causing untimely solidification.

After mixing, the mixed solutions were dispersed in a hot phase immiscible with water, as a result of which solidification in the form of microspheres occurred.

An additional advantages of the use of anion-deficient solutions is that less solution of ammonia-releasing agent is now needed in order to bring about complete hydrolysis, as part of the anions has already been removed. As a result of both the aforementioned causes the mixed solutions contain far less water than would be the case with solutions of normal salts.

For these reasons less water needs to be removed from pieces or drops which one wishes to solidify than is the case with normal solutions; in other words, contraction is less. Thanks to this lesser contraction better final products can now be prepared.

It was formerly assumed that the granular particles of solid substance could only be prepared from the above-mentioned anion-deficient salt solutions after further processing. The further processing consisted for instance in digesting and further treating with an anion-exchanger, as a result of which sols were formed.

The preparation of uranium oxide spheres from nitrate-deficient uranyl nitrate solutions was formerly only found possible after a costly reduction of the 6-valent uranium to quadrivalent in the liquid phase.

In order to improve the storage time and processing capacity of the mixed solutions of anion-deficient salt and ammonia-releasing agent, it is very advantageous to cool both solutions before mixing to a temperature below 10° C. and to store the mixture at this temperature preferably in the absence of light. Any premature solidification of the mixed solutions due to decomposition of the ammonia-liberating substance can be prevented by cooling.

The need for very large spherical particles of actinide oxide and carbide has of late been very pronounced in nuclear technique.

It has been found possible according to the aforementioned new method to prepare large, spherical particles of metal oxide hydrate, mixed or unmixed with carbon, with a diameter between 3 and 6 mm. For this purpose the anion-deficient salt solution, to which finely divided carbon is added if desired, is dispersed in a hot phase not miscible with water, with a density which is between 0 and 0.5 g./cm.$^3$ lower than that of the mixed solutions. The phase not miscible with water should in this case have a temperature between 65° and 120° C. and, at the working temperature, have an interfacial tension with respect to water of at least 25 dynes/cm.

For the preparation of large spherical particles of actinide oxide hydrate, the anion-deficient actinide salt solutions to which, if desired, finely divided carbon and an ammonia-releasing agent have been added, should have a concentration of actinide metal which lies between 0.1 and 2 mols per kg. of anion-deficient salt solution (mols/kg.).

The concentration in mols/g. stated above for anion-deficient actinide salt solutions deviates from the normal value stated in mols per litre. For analytical purposes it is easier to weigh out a certain quantity of a highly concentrated salt solution than to measure out a certain volume of such solution.

Good combinations of densities for the anion-deficient salt solutions mixed with ammonia-releasing agents and the phases immiscible with water are densities between 1.1 and 1.6 and between 0.6 and 1.6 g./cm.$^3$ respectively.

The use of organic liquids, which form an azeotrope with water having a boiling point lower than 100° C., at a temperature equal to or higher than the boiling point of the azeotrope, is highly advantageous for the removal of water from the solidifying drops.

Suitable liquids immiscible with water which conform to the requirements of the above-mentioned high specific gravity and high interfacial tension with respect to water are, inter alia, ethane tetrachloride, ethylene tetrachloride (perchloroethylene) and possibly carbon tetrachloride or mixtures of these substances.

A very suitable liquid immiscible with water is ethylene tetrachloride at a temperature between 88° and 95° C. Ethylene tetrachloride forms with water an azeotrope having a boiling point of 88.5° C. and the composition 17.2 percent by wt. of water and 82.8 percent by wt. of ethylene tetrachloride.

In order to cause large drops of liquid to remain stable in the phase immiscible with water, this phase should have a high interfacial tension with respect to water, and the difference in density of the two phases should remain within certain limits.

For anion-deficient salt solutions of high specific gravity this condition is satisfied by the aforementioned liquids ethane tetrachloride, ethylene tetrachloride and carbon tetrachloride.

For anion-deficient salt solutions of lower specific gravity these liquids are no longer satisfactory because of their great difference in density. Dilution with liquids of lower specific gravity would seem to be the right way to diminish the difference in density.

It has been found, however, that the liquid of lower density must likewise have a high interfacial tension with respect to water. As a matter of fact, only a comparatively small number of such liquids with a high interfacial tension with respect to water are known and obtainable commercially. Suitable liquids of lower density and high interfacial tension with respect to water are, for instance, benzene, heptane, hexane, toluene, xylenes or mixtures of these or similar liquids.

Besides azeotrope-forming liquids it is quite possible to use hot higher alcohols which are saturated with water and are immiscible with water at the working temperature.

Owing to the fact that the alcoholic phase is warm and is saturated with water, it has no dehydrating properties. As a result of too powerful dehydrating properties of the liquid, cracks in the solidified drops occur in the course of washing with ammonia.

Alphanol-79 is in this respect a very suitable alcohol mixture. Alphanol-79 is a commercially obtainable mixture of higher alcohols with a mean molecular weight of 127. Instead of Alphanol-79, 2-ethylhexanol is also suitable. It has been found that commercial paraffin oil is likewise an excellent solidification medium. Furthermore, it appeared that mixtures of commercial paraffin oil with the aforementioned chlorated hydrocarbons, higher alcohols or organic solvents or mixtures of these latter substances were applicable.

The properties of oxides and/or carbides of certain actinide metals can be improved by adding one or more other salts to the anion-deficient actinide salt solutions.

Among such actinide metals may be understood in this connection: uranium, plutonium, americium, curium and any metals with a still higher atomic number.

Other metal salts are the salts of thorium, zirconium, hafnium, yttrium and all the fifteen rare-earth metals.

(It is to be noted that promethium is also to be included among the rare-earth metals that may be used.)

The intended improvement relates to better stability of actinide oxides, better thermal conductivity of these actinide oxides and incorporation of a reactivity-controlling nuclear poison in oxidic and carbidic nuclear fuels.

By better stability of actinic oxides is meant better stability with respect to water and oxygen as regards oxidation and as regards the occurrence of undesirable sudden changes in volume in case of a rise in temperature due to phase transitions.

With uranium dioxide this is achieved by stabilizing the fluorite structure. By the addition for instance, of yttrium salts to a nitrate-deficient uranyl nitrate solution the thermal conductivity of uranium oxide prepared from this solution is improved.

By adding to the aforementioned anion-deficient actinide salt solutions salts of rare-earth metals or of hafnium, which metals have a high active cross-section for neutrons, it is possible to obtain oxide or carbide fissile particles with a so-called burnable poison. Rare-earth metals with a high active cross-section for neutrons are samarium, europium, gadolinium or dysprosium; it is likewise possible to use salts of fractions of rare-earth metals containing the aforementioned elements for the purpose of reactivity control.

With reference to the addition of thorium salts to an anion-deficient solution of uranyl salts it is observed that it has so far not proved possible, without reducing the 6-valent uranium in the liquid phase, to prepare sols with a uranium-to-thorium ratio greater than 1, see Dutch patent application 6605885 in the name of Reactor Centrum Nederland (Stichting). Dutch patent application 6605885 deals with the preparation of mixed sols of 6-valent uranium and 4-valent thorium and gels, oxides and carbides which can be prepared from them.

In Dutch patent application 6605885 it is stated on page 2, lines 14 to 16, that it is desirable that the design of nuclear reactors should not be restricted by reason of the limited choice of uranium-to-thorium ratios in granular fissile substances. By using sols containing a uranium-to-thorium ratio up to 1:1 instead of the formerly usual sols having a uranium-to-thorium ratio of 1:4, the applicant in Dutch patent application 6605885 aims at increasing the choice of fissile materials without having to resort to the costly operation of reducing 6-valent uranium in the liquid phase.

By using mixed anion-deficient solutions of thorium and uranyl salts, it is possible according to the aforementioned processes to obtain any desired uranium-to-thorium ratio in granular fissile materials without reducing the uranyl salt in the liquid phase.

It has been found that a very suitable method for the preparation of mixed uranium-thorium fissile materials is to withdraw anions from a mixed solution of 6-valent uranium and 4-valent thorium salts.

For this purpose the solution of the mixed salts is preferably treated with a liquid anion-exchanger such as Primene JMT. Primene JMT is a commercially obtainable mixture of primary amines and is used in solution in an organic phase.

If a solution of a uranyl salt that has been treated with a liquid anion-exchanger is added to a thorium salt solution that has likewise been treated with an anion-exchanger, it is possible, depending upon the molar ratio of metal to conjugated base and the strength of concentration of the metal, that a precipitate forms.

It will be preferable for this reason to treat a mixed solution of uranium (VI) and thorium (IV) salts with the liquid anion-exchanger.

The invention is further elucidated below in a number of examples described in detail.

In some experiments of smaller scope, microspheres of uranium (VI) oxide-hydrate were prepared by dispersing the nitrate-deficient uranyl nitrate solution mixed with a hexamethylene-tetramine solution (hexa-methylene-tetramine, hereinafter called hexa) in mixtures of carbon tetrachloride and liquids of lower density.

Similarly, pieces of uranium (VI) oxide hydrate were prepared by mixing a nitrate-deficient uranyl nitrate solution with a solution of hexa and then heating. On solidification of the mixed solutions pieces of solid substance were obtained, which were washed out with ammonia solution.

Example I deals with the preparation of a nitrate-deficient uranyl nitrate solution.

Example II deals with the preparation of uranium (VI) oxide hydrate spheres and $UO_2$ spheres thereof.

Example III deals with the preparation of carbon-containing uranium (VI) oxide hydrate spheres.

Examples IV and V deal with the preparation of mixed 6-valent uranium-4-valent thorium oxide hydrate spheres with a high content of uranium (VI) oxide hydrate.

Example VI deals with the preparation of thorium (IV) oxide hydrate spheres with a low content of uranium (VI) oxide hydrate.

Examples VII, VIII and IX deal with the preparation of spheres of uranium dioxide containing respectively Zr, La and Y.

Example X deals with the preparation of spheres of uranium dioxide containing plutonium.

EXAMPLE I

A quantity of 320 ml. of 1 molar $UO_2(NO_3)_2$ was introduced into a glass beaker of 500 ml. capacity. To the $UO_2(NO_3)_2$ solution there was added 50.3 g. of Primene JMT, dissolved in 50 ml. of Shellsol A. The solution was then stirred intensively for 1 minute with a Vibromischer. After the Vibromischer had been switched off, the organic phase and the aqueous phase separated after a few minutes. The aqueous phase was drained off and evaporated to a 3.6 mol/l. strength of uranium (VI).

It was found by measurement that the exchange capacity of Primene JMT amounted to 2.92 mg. eq. of $HNO_3$/gram of amine.

In the above, therefore, the amount of $HNO_3$ extracted was $50.3 \cdot 2.92 \approx 147$ mmol of $HNO_3$. The amount of $NO_3'$ originally present was $320 \cdot 1 \cdot 2 = 640$ mmol. After extraction there remains of $NO_3'$: $640 - 147 = 493$ mmol, so that the molar nitrate-to-uranium ratio is $$\frac{493}{320} = 1.54$$

As a check the actual amounts of $NO_3'$ and of $UO_2^{2+}$ were determined, and the nitrate-to-uranium ratio thus found was 1.55.

EXAMPLE II

To 10 ml. of the denitrated $UO_2(NO_3)_2$ solution, concentrated to 3.2-molar strength according to Example I, which solution was cooled to 5° C., a quantity of 20 ml. of a 2-molar hexa solution, similarly cooled to 5° C., was added.

After the two solutions had been mixed the mixture was sprayed in drop-form by means of injection needles into Alphanol-79 saturated with water having a temperature somewhere near 90° C.

After a residence time of about 1 minute in the Alphanol the microspheres formed were removed from the liquid. Then the spheres were washed out on a filter with carbontetrachloride in order to remove residues of Alphanol. After this washing out with tetra the spheres were freed from $NH_4NO_3$ by washing out with 50 ml. of strong ammonia (25% by wt.), after which the residues of ammonia were finally removed by rinsing with 50 ml. of acetone or methyl-ethyl ketone.

After a period of contact with the atmosphere the yellow spheres were sintered, after being dried, at a temperature of 1150° C. in a furnace in an atmosphere of hydrogen gas.

The diameters of the $UO_2$ spheres finally obtained varied from $>500\mu$ to $<1000\mu$, depending upon the original drop size.

In the experiments forming the basis of Example II, no attempt was made to ascertain the optimum conditions for obtaining spheres with very large diameters.

EXAMPLE III

To 10 ml. of a nitrate-deficient solution of uranyl nitrate in which the uranyl nitrate had approximately the formula $UO_2(NO_3)_{1.5}(OH)_{0.5}$ and was 2.9 molar, a quantity of 1.64 g. of "United 15" carbon was added, after which homogenization was effected. After cooling to 5° C. an amount of 20 ml. of a 2-molar hexa solution cooled to 5° C. was added. This was followed by all the operations according to Example II, with the exception of heating in the furnace.

The product consisted of microspheres loaded with carbon.

EXAMPLE IV

A mixture consisting of 10 ml. of a denitrated thorium nitrate solution, thorium concentration 1.3 mols per litre, nitrate-to-thorium ratio 1.13 and 50 ml. of a denitrated uranyl nitrate solution, uranium concentration 2.93 mols per litre, nitrate-to-uranium ratio 1.36 was cooled in ice water. Of the mixture obtained, 1 ml. was mixed with 2 ml. of a 2-molar hexa solution similarly cooled in ice water.

This was followed by all of the actions according to Example II with the exception of heating in the furnace.

EXAMPLE V

A mixture of 7.2 ml. of $Th(NO_3)_4$ solution with a concentration of 2.23 mols/l. and 68.9 ml. of $UO_2(NO_3)_2$ solution with a concentration of 2.09 mols/l. was diluted with water to a total uranium and thorium concentration of 1 mol/l. After this the diluted solution was shaken for 1 minute with a solution of 17.8 ml. of Primene JMT and 17.8 Shellsol A.

Lastly, after separation of the organic liquid the denitrated solution was evaporated to a concentration of aproximately 3 mols/l.

The analysis of the denitrated in concentrated salt solution was as follows:

U=1.89 mols/kg.
Th=0.24 mol/kg.
$NO_3'$=2.45 mols/kg.
Density 1.74 g./cm.$^3$ $$\frac{(NO_3^-)}{(Th)+(U)}=1.15$$

After cooling in ice water a quantity of 2 ml. of the above solution was mixed with 2 ml. of a 2-molar hexa solution which had likewise been cooled in ice water.

After this the mixed solution was injected into hot Alphanol-79 having a temperature of 90° C.

Orange-yellow microspheres were formed which, after washing with an ammonia solution of 25% by weight and rinsing with acetone were dried, at a temperature of 60° C.

EXAMPLE VI

A mixture of 44.8 ml. of $Th(NO_3)_4$ solution having a concentration of 2.23 mols per litre and 9.6 ml. of $UO_2(NO_3)_2$ solution having a concentration of 1.89 mols per litre, was shaken for 1 minute with a solution of 110.3 ml. of Primene JMT in 110.3 ml. of Shellsol A. After this the organic phase was separated from the aqueous phase and the resulting, denitrated salt solution was concentrated to a strength of about 3 molar.

The analysis of the concentrated denitrated salt solution was as follows:

Th=0.68 mol/kg.
U=0.12 mol/kg.
$NO_3'$=1.22 mols/kg.
Density=1.26 g./cm.$^3$ $$\frac{(NO_3')}{(Th)+(U)}=1.53$$

Of the above solution 1 ml. was mixed, after having been cooled with ice water, with 1.6 ml. of a hexa solution, similarly cooled in ice water, having a concentration of 2 mols per litre.

The operations of solidifying to spheres, washing out and desiccation were effected according to the methods stated in Example V.

EXAMPLE VII

An amount of 1.288 grams of $ZrO(NO_3)_2 \cdot 2H_2O$ was dissolved at room temperature in 1 ml. of water. To the viscous, somewhat opalescent liquid obtained, an amount of 7 ml. of a 3.0-molar nitrate-deficient uranyl nitrate solution with a molar nitrate-to-uranium ratio of 1.5 was added. The mixed solution obtained then contains 18.3 at. percent of Zr and 81.7 at. percent of U (VI); the density is 1.83 g./cm.$^3$ at a total Zr and U concentration of 3.02 mols/l.

Of the mixed solution, 1 ml. was cooled to a temperature below 10° C. and mixed with a similarly cooled solution of ammonia-releasing agent. The solution of the ammonia-releasing agent contained 1.5 mols/l. of hexa and 1.5 mols/l. of urea. After this the mixture was introduced into a solidification column containing commercial paraffin oil of 90° C. After solidification the spheres were drained off, rinsed with carbon tetrachloride and washed-out for half an hour with 14-molar ammonia solution.

The washed-out spheres were dried for 1 hour in air and afterwards sintered in an atmosphere of hydrogen gas at a temperature of about 1200° C.

EXAMPLE VIII

A quantity of 1.301 g. of $La(NO_3)_3 \cdot 6H_2O$ was dissolved at room temperature in 1 ml. of water. To the solution obtained there was added a quanity of 7.6 ml. of a 3.0-molar nitrate-deficient uranyl nitrate solution having a molar nitrate-to-uranium ratio of 1.5. The solution obtained in this way contained 11.7 at. percent of La and 88.3 at. percent of U (VI), whilst the density was 1.9 grams/cm.$^3$ at a total concentration of La and U (VI) of 2.9 mols/l. Of this solution an amount of 1 ml. was processed to spheres according to the methods stated in Example VII.

EXAMPLE IX

A quantity of 0.683 grams of $Y_2O_3$ was dissolved during heating in about 2 ml. of strong $HNO_3$. After the excess of $HNO_3$ had been carefully fumed off, a clear viscous liquid was obtained. To the yttrium solution obtained there was added, while stirring, an amount of 9 ml. of a 3.0-molar nitrate-deficient uranyl nitrate solution with a molar nitrate-to-uranium ratio of 1.5. The mixed solution obtained contained 10.0 at. percent of Y and 90.0 at. percent of U (VI), whilst the density was 1.9 grams/cm.$^3$ at a total concentration of Y and U (VI) of 3.3 mols/l. Of this solution an amount of 1 ml. was processed to spheres according to the methods stated in Example VII.

EXAMPLE X

A quantity of 1 ml. of a 3.51 molar nitrate-deficient uranyl nitrate solution having a molar nitrate-to-uranium ratio of 1.52, was mixed with 0.2 ml. of an acidified 2.24-molar plutonium nitrate solution. The resulting mixed solution contains 11.3 at. percent of Pu and 88.7 at. percent of U (VI). The density of the nitrate-deficient uranyl nitrate solution is 2.05 g./cm.$^3$.

To the mixed solution, 3 ml. of a solution of ammonia-releasing agent was added according to Example VII, without cooling, and injected into an organic liquid heated to 110° C., which liquid consisted of equal parts of paraffin oil and perchloroethylene. The solidified spheres were then processed according to the methods stated in Example VII and heated to 1200° C. in an atmosphere of hydrogen gas, as a result of which well-formed microspheres of 800 to 900μ were obtained.

I claim:

1. A process for the preparation of grains comprising a metal oxide hydrate comprising the steps of:
   (a) providing a concentrated aqueous anion-deficient salt solution of an actinide metal selected from the group consisting of uranium, plutonium, americium and curium and simultaneously adding ammonia and heat forming a solid metal oxide hydrate;
   (b) separating solid metal oxide hydrate from the reaction mixture of step (a);

(c) washing the solid product obtained; and
(d) drying the solid metal oxide hydrate product at an elevated temperature.

2. The process of claim 1 wherein the anion-deficient actinide metal salt solution additionally contains a salt of a member selected from the group consisting of thorium, zirconium, hafnium, rare earths and yttrium.

3. The process as claimed in claim 2 wherein the anion-deficient salt solution is a mixed solution of a salt of uranium (VI) and a salt of thorium (IV).

4. The process as claimed in claim 2 wherein an acid solution of yttrium (III) or plutonium (IV) nitrate is added to a nitrate-deficient uranyl nitrate solution.

5. The process as claimed in claim 1 wherein particles of finely divided carbon are added to the concentrated aqueous solution of anion-deficient metal salt of step (a) and the hydrated product of step (d) is thereafter subjected to the additional steps of:
(e) mild heating to convert the metal oxide hydrate to the corresponding metal oxide and carbon; and
(f) heating the metal oxide and carbon of step (e) at a higher temperature in a protecting atmosphere to form the corresponding metal carbide.

6. The product produced by the process of claim 1.

7. A process for the preparation of grains comprising a metal oxide hydrate comprising the steps of:
(a) mixing a concentrated aqueous anion-deficient salt solution of an actinide metal selected from the group consisting of manium, plutonium, americium and curium with an ammonia-releasing agent;
(b) dispersing the mixture of step (a) in an immiscible liquid selected from the group consisting of chlorinated hydrocarbons, chlorinated hydrocarbons diluted with an organic solvent, higher molecular weight alcohols, paraffin oil and mixtures thereof at a temperature of about 65 to 120° C.;
(c) separating the solid metal oxide hydrate from the immiscible liquid of step (b);
(d) washing the solid product obtained; and
(e) drying the solid metal oxide hydrate product at an elevated temperature.

8. The process as claimed in claim 7 wherein the chlorinated hydrocarbon is selected from the group consisting of ethane tetrachloride, ethylene tetrachloride, carbon tetrachloride and mixtures thereof.

9. The process as claimed in claim 7 wherein the organic solvent is selected from the group consisting of hexane, heptane, benzene, toluene, xylene and mixtures thereof.

10. The process as claimed in claim 7 wherein the higher molecular weight alcohol is 2-ethylhexanol.

11. The process of claim 7 wherein the anion-deficient actinide metal salt solution additionally contains a salt of a member selected from the group consisting of thorium, zirconium, hafnium, rare earths and yttrium.

12. The process as claimed in claim 11 wherein the anion-deficient salt solution is a mixed solution of a salt of uranium (VI) and a salt of thorium (IV).

13. The process as claimed in claim 11 wherein an acid solution of yttrium (III) or plutonium (IV) nitrate is added to a nitrate-deficient uranyl nitrate solution.

14. The process as claimed in claim 7 wherein the ammonia-releasing agent is hexamethylenetetramine.

15. The process as claimed in claim 7 wherein both the aqueous actinide metal salt solution and the liquid phase of the ammonia-releasing agent are cooled to a temperature below about 10° C. before mixing in step (a).

16. The process as claimed in claim 7 wherein at least one actinide metal salt solution is mixed with a solution of the ammonia-releasing agent and the concentration of the actinide metal in the mixed solution is from about 0.1 to about 2 moles/kg.

17. The process as claimed in claim 7 wherein particles of finely divided carbon are added to the concentrated aqueous solution of anion-deficient metal salt of step (a) and the hydrated product of step (e) is thereafter subjected to the additional steps of:
(f) mild heating to convert the metal oxide hydrate to the corresponding metal oxide and carbon; and
(g) heating the metal oxide and carbon of step (e) at a higher temperature in a protecting atmosphere to form the corresponding metal carbide.

18. The product produced by the process of claim 7.

References Cited

UNITED STATES PATENTS

| 3,312,632 | 4/1967 | Smith | 252—301.1 |
| 3,367,881 | 2/1968 | Morse | 252—301.1 |

FOREIGN PATENTS

| 904,679 | 8/1962 | Great Britain | 252—301.1 S |
| 1,169,210 | 10/1969 | Great Britain | 252—301.1 S |

CARL D. QUARFORTH, Primary Examiner

R. L. TATE, Assistant Examiner

U.S. Cl. X.R.

23—354, 355; 252—301.1 S; 264—0.5